Patented Nov. 3, 1936

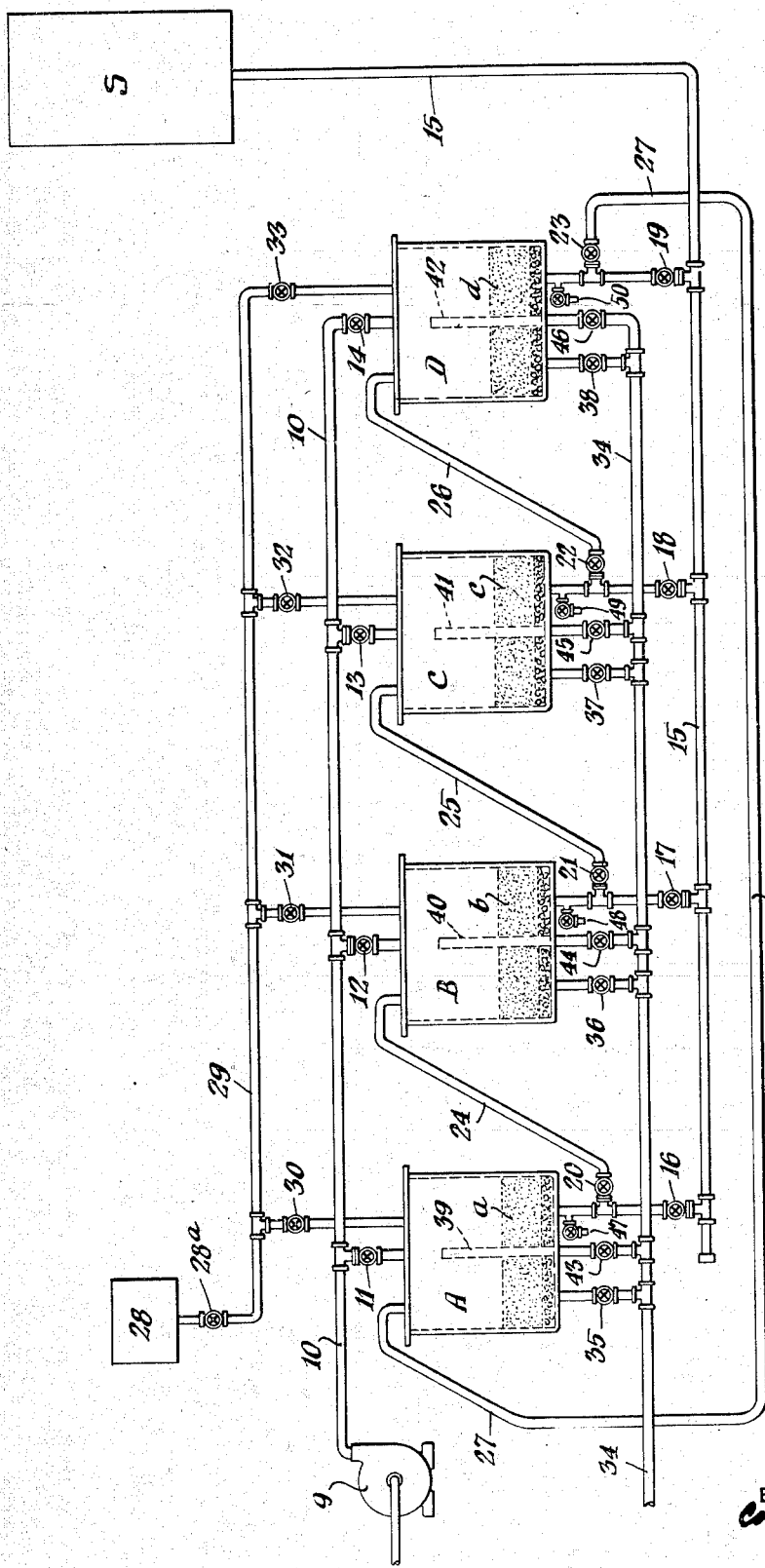

2,059,553

UNITED STATES PATENT OFFICE 2,059,553

REMOVAL OF FLUORINE FROM WATER

Harry V. Churchill, New Kensington, Pa.

Application October 2, 1933, Serial No. 691,759

12 Claims. (Cl. 210—16)

This invention relates to the purification of water, and it is particularly concerned with the treatment of water for the removal of fluorine.

Many waters considered pure and satisfactory for drinking purposes or industrial use, in that they are free from putrescible matter and disease-producing organisms, contain in solution a substantial amount of inorganic material. Included among the inorganic compounds in waters occurring in certain areas of the country are small amounts of fluorine occurring probably as the fluorides of calcium, sodium or aluminum, or double fluorides of these elements. Waters having fluorine contents varying from a fraction of one part per million to 14 or 15 parts per million have been reported.

It is accordingly an object of the present invention to provide a simple and effective method for the treatment of fluorine-contaminated waters to substantially reduce the fluorine content thereof. It is more particularly an object of the invention to provide a method for the removal of fluorine from solution in water when present therein in relatively minute amounts. Another object is to provide a continuous method of treatment to reduce the fluorine content of the water to less than 2 parts per million without increasing the dissolved solids content of the water. A further object is to provide a continuous method of simultaneously reducing the fluorine content and the hydrogen ion content of the water.

This invention is predicated upon the discovery that alumina in certain activated forms possesses the property of removing fluorine from solution in water, even when present therein in very small amounts. I have found that by bringing the contaminated water into contact with activated alumina in the presence of alkali metal ions, the fluorine content of the water may be substantially decreased, and that by bringing the water into contact with activated alumina prepared at a temperature of 400° to 500° C., water completely free from fluorine (determined spectrographically) may be obtained. At the same time, the hydrogen ion concentration of the water may be substantially lowered. Furthermore, I have found that the power of activated alumina to remove fluorine, after having been exhausted by treatment of a comparatively large quantity of water, may be restored by a simple washing treatment without the necessity of reactivation by heating. To these and other ends the invention comprises the novel features and procedure hereinafter described.

The activated alumina preferred for use in the treatment of water according to my invention is an adsorptive aluminous material the active adsorbing portion of which is composed of aluminum hydrate which has been calcined at a temperature between 300° and 800° C. and which, by reason of the partial dehydration caused by such calcination, is adsorptive and/or absorptive, but other forms of activated alumina may be used. However, I have found that activated alumina prepared at a temperature of 400° to 500° C. has the best adsorptive power for fluorine. I have also found that by treatment with activated alumina the fluorine content of the water may be completely removed. The capacity of removing all the fluorine from water (i. e., the capacity at 100 per cent efficiency) is not, however, the total adsorptive capacity of the activated alumina. On the contrary when this capacity at 100 per cent efficiency is exhausted the activated alumina will still continue to adsorb fluorine; and because of this high total power of adsorbing fluorine, relatively large quantities of water may be treated with a given amount of the activated alumina before regeneration of the latter is necessary.

In the practical operation of my process I have found that certain forms of massive activated alumina are particularly satisfactory for use. One form, which may be designated as activated alumina scale, may be obtained by the calcination of the massive form of aluminum hydrate deposited from a sodium aluminate solution as a scale in the alumina precipitator tanks during the practice of the Fickes-Sherwin modification of the Bayer process for the production of purified alumina. The other form of massive activated alumina which I have found particularly useful in my invention is activated bauxite prepared by calcining bauxite, the naturally occurring form of aluminum hydrate. The bauxite used in the preparation of activated bauxite for the purposes of this invention should preferably be substantially free from sulfates, as their presence in the bauxite reduces its adsorptive properties. It is preferable also that the activated bauxite be thoroughly washed prior to use for removing fluorine from water, in order to remove any soluble compounds which may have been formed among the impurities by the heating of the activation treatment. For use in the method of my invention the massive activated alumina is broken up or crushed to granular form.

The treatment with activated alumina according to the present invention may be carried out on either acid or alkaline waters, but it is generally preferable to treat water having a pH value of 4 to 8. Particularly good results are often obtained with water at a pH of 5 to 6.5. It is in general necessary in carrying out the water treatment that there be present alkali metal ions in sufficient quantity to be the chemical equivalent of a considerable amount of the fluorine present, preferably at least half, the alkali metal ions being in the activated alumina or in solution in the water. In most if not all cases naturally occurring waters contain alkali metal ions in excess of the required amount. Furthermore, the activated alumina, particularly the massive form, such as the activated alumina scale or the activated bauxite mentioned above, will usually contain alkali metal salts which will supply any deficiency (of alkali metal ions) that might occur in the water being treated, until the alkali salt content of the activated alumina is used up. It is ordinarily not necessary, therefore, to add alkali metal salts to the water or to the activated alumina, but if such addition is necessary or desirable, a suitable amount of a soluble sodium, potassium, or equivalent ammonium salt may be added. The salts to be used are those salts which will not either of themselves or by reaction with other compounds in the water or the adsorbent detract from the potability of the water or its usefulness for other purposes, or impair the efficiency of the adsorbent. Organic salts, or salts which will substantially increase the pH value of the water or which will precipitate insoluble compounds in the adsorbent bed are in general unsatisfactory. Preferably sodium salts of the strong mineral acids, such as hydrochloric, sulfuric and nitric acids, are used. Sodium chloride gives satisfactory results, and is readily dissolved in the water prior to treatment with the activated alumina.

The activated alumina may be regenerated by washing with dilute alkali or dilute acid. Alkaline regeneration may be carried out by washing the spent material with a solution of sodium, potassium or ammonium hydroxide. The concentration of the alkali hydroxide solution is not critical. However, in its more concentrated solutions the alkali has an undesirable solvent action on the alumina, and it is therefore generally preferable to use solutions containing not more than about 10 per cent of alkali. It is sometimes desirable also that subsequent to an alkaline regeneration the activated alumina be treated with dilute acid in order to permit subsequent water treatment at a pH of 4 to 8. If it is desirable or necessary to retain in the activated alumina any of the alkali left by the alkaline regeneration treatment the acid wash may be so conducted as to leave the desired amount of alkali in the alumina. Acid regeneration may be carried out by washing with a dilute solution of hydrochloric acid, or an acid salt, such as aluminum chloride. Dilute solutions of hydrochloric acid preferably containing about 1 per cent HCl have proved satisfactory. Subsequent to the acid wash the adsorbent may be washed with water to completely remove the fluorine compounds freed from the adsorbent by the acid and to remove excess acid.

The treatment of the water with activated alumina may be effectively carried out by any suitable means for exposing to the water a relatively large surface of adsorbent. For this purpose I have found it desirable to cause the water to percolate through a bed of massive activated alumina crushed to about 20 to 35 mesh. Beds of such material present the advantage of permitting rapid flow of the water while presenting a large adsorbing surface. Furthermore, massive activated alumina will retain its form without breaking up or powdering on long continued use and repeated regeneration. The treatment of the water may be carried out by a discontinuous method, using a single bed of adsorbent with alternate cycles of water-treatment and adsorbent regeneration. This type of method may prove satisfactory where relatively small quantities of water are to be treated. However, intermittent treatment of water is less efficient, particularly for the production of water completely free from fluorine, since in the latter case the adsorbent can be used only to the extent of its capacity at 100 per cent efficiency before regeneration is required. My invention accordingly contemplates in its preferred form a continuous method in which the water is passed through activated alumina containing successively less fluorine previously adsorbed, and finally through alumina still capable of adsorbing fluorine at 100 per cent efficiency.

In the accompanying drawing is illustrated one form of apparatus suitable for the continuous treatment of water for the removal of fluorine according to my invention.

Referring to the drawing, columns A, B, C and D containing beds or columns $a$, $b$, $c$ and $d$ of activated alumina are connected by pipe 10 and valves 11, 12, 13 and 14 with a source of raw water through pump 9, and by pipe 15 and valves 16, 17, 18 and 19 with a storage tank S for treated water. Each column A, B, C, D is also connected to the next in series by the valves 20, 21, 22 and 23 and the pipes 24, 25, 26 and 27. By proper operation of these valves the water may be passed from the source through any two or more of the adsorbent beds to the storage tank while the remainder of the beds may be cut out of the system for regeneration. The adsorbent beds are also connected with a tank 28 containing the regenerating solution by pipe 29 and valves 30, 31, 32 and 33, and to the waste pipe 34 by valves 35, 36, 37 and 38. Each adsorbent bed is also provided with an overflow connection 39, 40, 41 and 42 through valves 43, 44, 45 and 46 to the waste pipe 34. Sampling cocks 47, 48, 49 and 50 are provided between columns A, B, C, D and pipe 15.

In carrying out in the preferred way the continuous process of my invention in this form of apparatus the adsorbent columns are charged with activated alumina scale prepared by heating at a temperature of 400 to 500° C. for two hours. The raw water to be treated is forced into the system by pump 9 through pipe 10 and passes through valve 11 into column A where it percolates through the adsorbent bed. The first portion of the water coming from this bed will be completely free from fluorine and may be passed through valve 16 and pipe 15 directly to the storage tank S. Ultimately, however, the adsorbent capacity at 100 per cent efficiency of bed $a$ will be exhausted. When this point is reached, the water coming from bed $a$ will not be completely free from fluorine, although it will have its fluorine content very substantially reduced. This effluent water instead of going directly to the storage tank is passed through valve 20 and pipe 24 into column $b$ where it percolates through the adsorbent to remove the last traces of fluorine, and then through valve 17 and pipe 15 to storage tank S. When the adsorptive capacity at 100 per cent efficiency of bed $b$ is exhausted, the water is passed through valve 21 and pipe 25 to bed c and thence to storage tank S through valve 18 and pipe 15. When bed c ceases to operate at 100 per cent efficiency the water is passed from c to d before delivery to tank S. Bed a, which for purposes of illustration may be assumed to have its total fluorine-adsorptive power exhausted, is now cut out of the water treatment system and is connected with the tank of regenerating agent 28 through pipe 29 and valve 30, valve 11 being closed and valve 12 opened. The regenerating agent flows through the adsorbent bed a and out the waste pipe 34 through valve 35, carrying with it a major portion of the adsorbed fluorides from the bed. The adsorbent bed may then be backwashed with fluorine-free water by closing valves 35 and 30 and opening valves 16 and 43. Fluorine-free water is forced from pipe 15 upward to valve 16 by the pressure in the system and rises through the adsorbent bed a to pass through the overflow 39 and valve 43, carrying with it any residual fluorine and excess regenerating agent from the bed. The bed a is then ready for re-use. When the adsorptive capacity at 100 per cent efficiency of bed d is exhausted, bed a, which has been regenerated, is returned to the water treatment system by way of pipe 27, and bed b is cut out for regeneration. Continuing this process, the beds are used in successive groups of three while the fourth is being regenerated, the last bed of each group operating at 100 per cent efficiency.

As a specific example of the results which may be obtained by the methods of my invention with a single bed of activated alumina adsorbent, water containing 20 parts per million of fluorine as sodium fluoride was passed through a bed of activated alumina. This water, after treatment, was shown to be completely free from fluorine. The initial pH of the water was 6.3 and the pH after treatment was 7.8.

Having now particularly described the method of my invention, what I claim is:

1. A method of removing fluorine from water comprising exposing the water to activated alumina for adsorption of fluorine, in the presence of alkali metal ions.

2. A method of removing fluorine from water comprising exposing the water to activated alumina prepared by heating at a temperature of 400 to 500° C., in the presence of alkali metal ions.

3. A method of removing fluorine from water comprising bringing the water at a pH of 4 to 8 into contact with activated alumina in the presence of alkali metal ions.

4. A method of removing fluorine from water comprising bringing the water at a pH of 4 to 8 into contact with activated alumina in the presence of alkali metal ions until the adsorptive capacity of the activated alumina has been materially decreased, regenerating the activated alumina, and thereafter bringing additional quantities of water into contact with the regenerated alumina.

5. In a method of removing fluorine from water as described in claim 4, the step comprising regenerating the activated alumina with dilute hydrochloric acid.

6. In a method of removing fluorine from water as described in claim 4, the step comprising regenerating the spent activated alumina with dilute caustic alkali.

7. The method of removing fluorine from water, comprising bringing the water at a pH of 4 to 8 into contact with activated alumina prepared by heating at a temperature of 400° C. to 500° C., in the presence of alkali metal ions.

8. A method of removing fluorine from water comprising exposing the water to activated alumina for adsorption of fluorine, in the presence of alkali metal ions, the activated alumina being the form produced by calcining aluminum hydrate at a temperature of 300° to 800° C.

9. A method of removing fluorine from water comprising bringing the water at a pH of 4 to 8 into contact with activated alumina in the presence of alkali metal ions, the activated alumina being the form produced by calcining aluminum hydrate at a temperature of 300° to 800° C.

10. A method of removing fluorine from water comprising bringing the water at a pH of 4 to 8 into contact with activated alumina in the presence of alkali metal ions until the adsorptive capacity of the activated alumina has been materially decreased, the activated alumina being the form produced by calcining aluminum hydrate at a temperature of 300° to 800° C.; regenerating the activated alumina; and thereafter bringing additional quantities of water into contact with the regenerated alumina.

11. In a method of removing fluorine from water by exposing the water, in the presence of alkali metal ions, to activated alumina of the form produced by calcining aluminum hydrate at a temperature of 300° to 800° C., the step of regenerating the activated alumina by washing the same with dilute hydrochloric acid.

12. In a method of removing fluorine from water by exposing the water, in the presence of alkali metal ions, to activated alumina of the form produced by calcining aluminum hydrate at a temperature of 300° to 800° C., the step of regenerating the activated alumina by washing the same with dilute caustic alkali.

HARRY V. CHURCHILL.